United States Patent [19]

Nesin

[11] Patent Number: 4,699,261

[45] Date of Patent: Oct. 13, 1987

[54] CLOSURE HANDLING APPARATUS

[76] Inventor: William Z. Nesin, 484B Milford Point Rd., Milford, Conn. 06460

[21] Appl. No.: 676,056

[22] Filed: Nov. 29, 1984

[51] Int. Cl.$^4$ ............................................. B65G 47/24
[52] U.S. Cl. ................................... 198/398; 198/391; 198/396
[58] Field of Search ............... 198/398, 399, 391, 392, 198/396; 193/44, 46; 221/159, 160, 161

[56] References Cited

U.S. PATENT DOCUMENTS

| | | | |
|---|---|---|---|
| 2,715,978 | 8/1955 | Sterling | 193/46 X |
| 3,065,841 | 11/1962 | Stover | 221/160 |
| 3,150,762 | 9/1964 | Tricini | 198/398 X |
| 3,168,949 | 2/1965 | Aidlin | 198/392 |
| 3,343,885 | 9/1967 | Lundeberg | 198/391 |
| 3,599,829 | 8/1971 | Aidlin et al. | 198/398 X |
| 3,656,605 | 4/1972 | Gess | 198/391 X |
| 3,860,145 | 1/1975 | Miller | 198/398 X |
| 4,281,758 | 8/1981 | Adamski et al. | 198/398 |
| 4,401,203 | 8/1983 | McDonald et al. | 198/392 |
| 4,474,197 | 10/1984 | Kinoshita et al. | 221/160 X |

FOREIGN PATENT DOCUMENTS

| | | | |
|---|---|---|---|
| 572520 | 3/1959 | Canada | 198/398 |
| 16848 | 11/1916 | United Kingdom | 198/398 |

*Primary Examiner*—Robert J. Spar
*Assistant Examiner*—Lyle Kimms
*Attorney, Agent, or Firm*—Laff, Whitesel, Conte & Saret

[57] ABSTRACT

A closure handling apparatus includes a cup-shaped receptacle having an opening in a cylindrical sidewall thereof, a rotary conical member within the receptacle and cooperative with a peripheral shelf member vertically spaced from the conical member to form a moving column of closures randomly oriented with their open ends up or down, a discriminating mechanism positioned within the receptacle for successively receiving the lead closure in the column and including an upstream and a downstream plate separated by a gap which is oriented transversely to the path of movement of the received closures, and a guide means downstream of the discriminating mechanism and outside of the receptacle for receiving from the discriminating mechanism closures having their open ends up. Closures having their open ends down are rejected by being deflected into the gap of the discriminating means and being cammed by the downstream plate back to the rotary conical member. A finger member interposed between the downstream plate and the rotary conical member is employed to invert the rejected closures on their way back to the rotary conical member so that on their next cycle through the discriminating means they will have their open ends up and be passed out to the guide means for subsequent utilization by downstream equipment.

Claim, 8 Drawing Figures

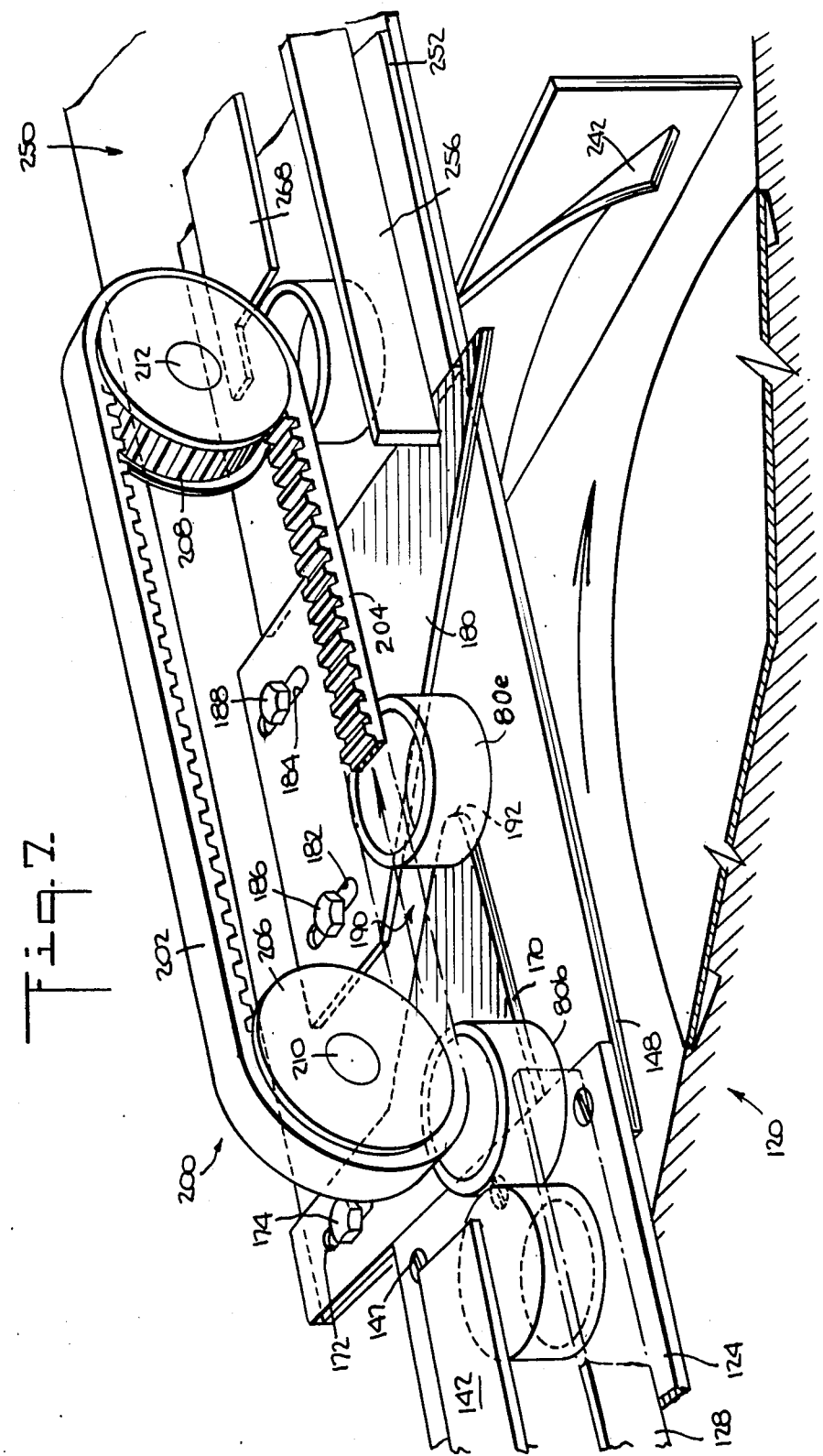

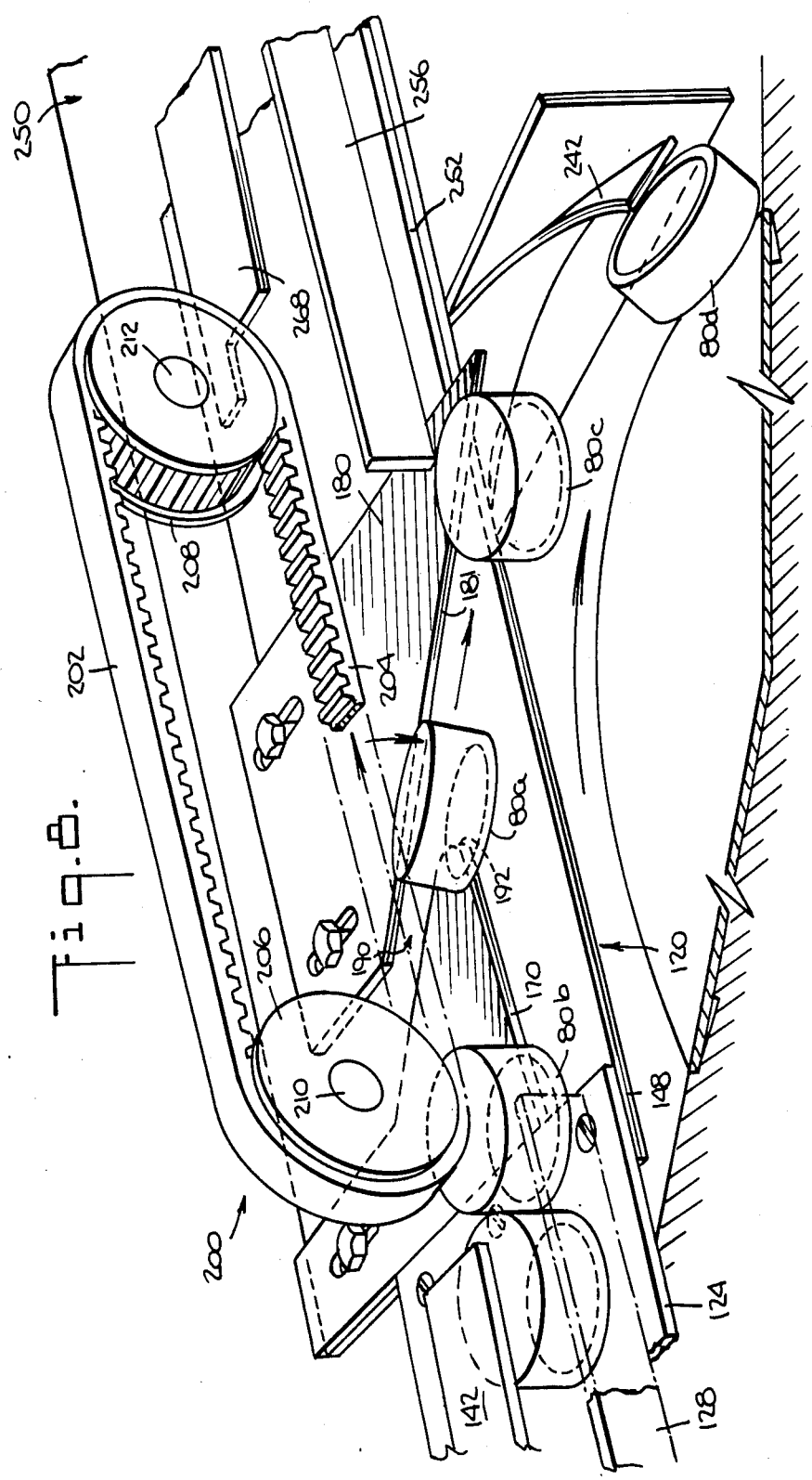

CLOSURE HANDLING APPARATUS

BACKGROUND OF THE INVENTION

1. Field of the Invention

The present invention relates to closure handling and orienting apparatus adapted to receive a supply of randomly arranged closures and to orient the same prior to depositing the closures into a supply chute from which successive closures are withdrawn for application to containers.

2. Description of the Prior Art

Prior closure handling apparatus includes the apparatus illustrated and described in U.S. Pat. Nos. 2,715,978, 3,300,022, and 3,726,385. Each of these patents discloses apparatus arranged to receive randomly oriented closures which are formed into a single line and advanced through sorting or orienting mechanisms adapted to reject those closures which assume a position other than a predetermined position of orientation, the oriented closures being delivered to the mouth of a supply chute from which successive closures are withdrawn.

U.S. Pat. No. 2,715,978 shows apparatus provided with an inclined rotary disk wherein the closures are carried upwardly by the inclined disk and guided between the beveled edge of a small rotary disk and a cooperating rail. Those closures which assume an oriented position are enabled to maintain a position of equilibrium between the rail and the disk and are deposited into the supply chute, whereas those closures which assume a positon other than an oriented position are rejected.

U.S. Pat. No. 3,300,022 shows a serrated disk mounted to rotate in a horizontal plane and which is arranged to guide randomly oriented closures in a line toward the serrated periphery of the disk. Those closures oriented with their open ends up are supported by the serrated edge and deposited into a supply chute, while those which assume a position with their open ends down fall over the serrated edge and are rejected.

U.S. Pat. No. 3,726,385 shows apparatus provided with a rotary disk wherein the closures are carried on the disk at one side thereof beneath a guide rail and the second side of the closures are supported, in one embodiment, by a star wheel and a cooperating second guide rail. Those closures which arrive at the star wheel with their open sides up are projected by an air blast from the star wheel into the supply chute without being deflected from their path of movement, while those closures arriving at the star wheel with their open sides down tilt as their side walls enter the grooves between the teeth of the star wheel, thereby disengaging from the second guide rail, and are projected by the air blast from the disk into a return chute which recirculates the closures back to the supply hopper. In a second embodiment of this patent, the star wheel is replaced by a short plate member which terminates short of the supply chute, leaving a gap in excess of the diameter of the closures being oriented. In this embodiment, which is intended for use with conical closures or closures having one end larger than the other, those closures having their enlarged ends up are retained by the side guide rails and moved across the gap under the impetus of the air jet, while those closures having their enlarged ends down are blown through the gap into the return chute to be recirculated back to the supply hopper.

While such prior art closures handling apparatus is efficient in use, the shape and size of the closures adapted to be handled thereby is limited. Furthermore, in each such prior art apparatus, air blasts are relied on to move the closures onto the supply chute and to remove the closures to be rejected from the column of closures being handled. The use of compressed air for this purpose is a potential source of oil contamination to the closures, precluding use of the apparatus in connection with products (e.g., pharmaceutical bottles) that must be free of such contaminants. Moreover, the apparatus requires expensive air compressing equipment and oil filtering equipment to support its operation.

SUMMARY OF THE INVENTION

In general, the present invention contemplates a closure handling machine that may be used in connection with the feeding mechanism of a closure applying machine where it is desired to deliver, without the use of compressed air, uncontaminated closures, such as screw caps for use on pharmaceutical bottles or other containers, at very high production rates, in a line and oriented to face in the same direction. In the illustrated embodiment of the invention, provision is made for withdrawing closures at random from a bulk supply thereof and for passing successive closures through a discriminating means positioned within the supply receptacle. The discriminating means includes a drive belt and camming mechanism which serves to forcibly and at high speed reject, within the receptacle, those closures presented to it in other than the desired position of orientation. Those closures presented to the discriminating means in an oriented position are advanced by the drive belt and passed through the wall of the receptacle to a guide means, or supply chute, which delivers the closures to a utilization station at which they may be applied to a container.

The present apparatus is particularly adapted for handling at high speed and efficiently closures which are greater in diameter that in height. Novel structure is provided for arranging the closures in a column and for rapidly advancing successive closures to and through novel discriminating mechanism arranged to reject those closures which do not assume a predetermined position of orientation, the rejection taking place within the bulk supply receptacle, without the use of compressed air, and at higher rates of speeds than heretofore encountered.

Accordingly, the invention has as its main object to provide novel and improved closure handling apparatus particularly adapted for sorting and orienting in a rapid and efficient manner, and without the use of compressed air, closures of the type which are greater in diameter than in height.

Another object of the invention is to provide novel and improved closure handling apparatus in which the sorting and orienting operation takes place within the bulk supply receptacle of the apparatus so that only properly oriented closures exit from the receptacle.

A further important object of the invention is to provide flipping means associated with the discriminating mechanism of the apparatus in order to turn over those closures which are rejected back to the bulk supply of closures so that during their next pass through the discriminating means, these closures will be properly oriented to pass through the same and exit to the guide means.

Yet another object of this invention is to provide a novel and improved closure handling apparatus in which the various elements of the discriminating and orienting device are adjustable in order to accommodate changes in the diameters and heights of the closures being handled.

Further objects and advantages of this invention will become apparent as the following description proceeds.

BRIEF DESCRIPTION OF THE DRAWINGS

While the specification concludes with claims particularly pointing out and distinctly claiming the subject matter of this invention, it is believed that the invention will be better understood from the following description, taken in conjunction with the accompanying drawings, in which:

FIGS. 7 and 8 are enlarged perspective views, with parts cut away for clarity, of the discriminating means, showing, respectively, the passages of open end up closures through the discriminating means to the guide means, and the rejection of closures from the discriminating means back to the feed means.

DESCRIPTION OF THE PREFERRED EMBODIMENT

Figure 1:
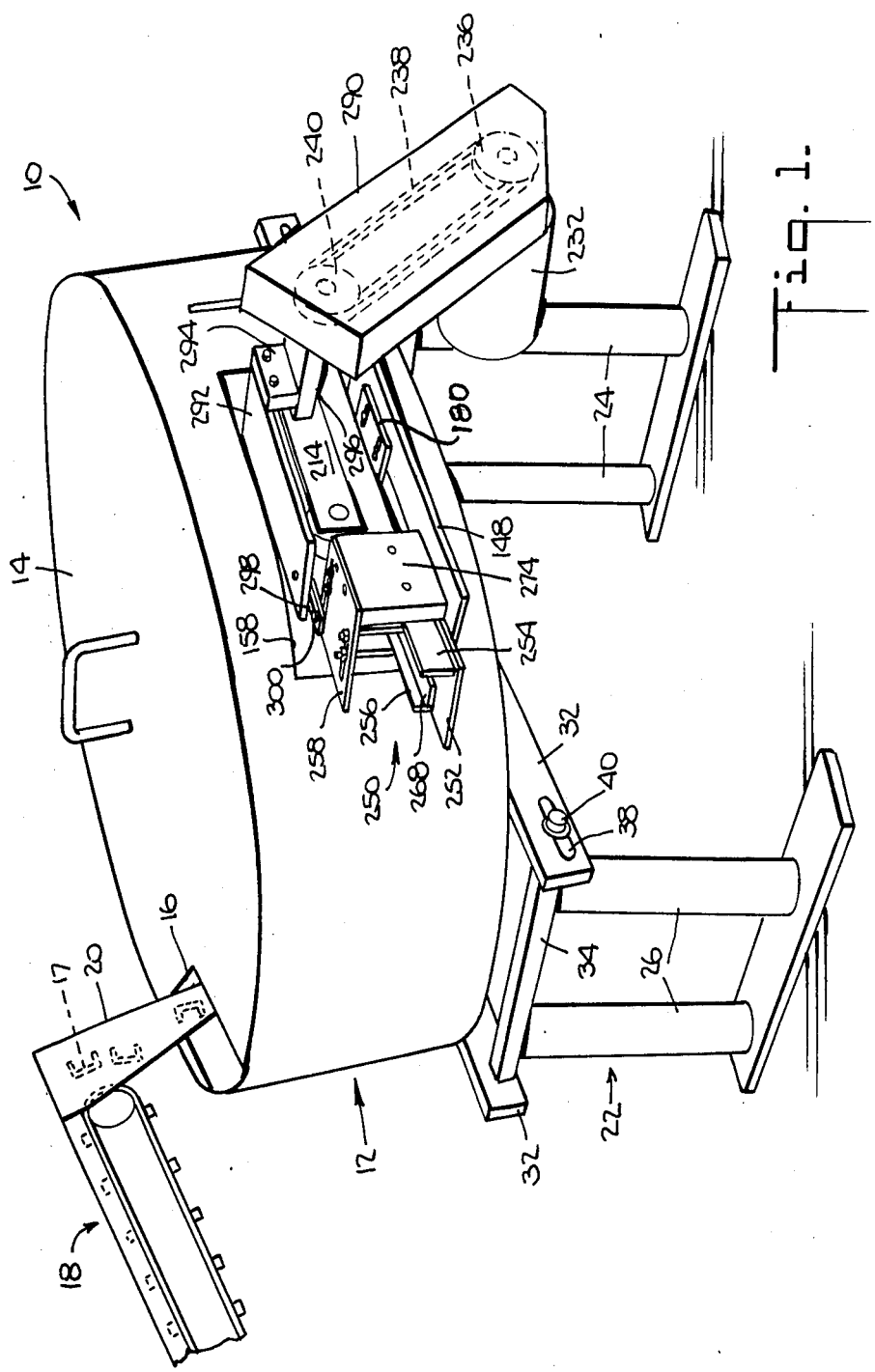
FIG. 1 is a perspective view of a closure handling apparatus made in accordance with this invention.
Figure 2:
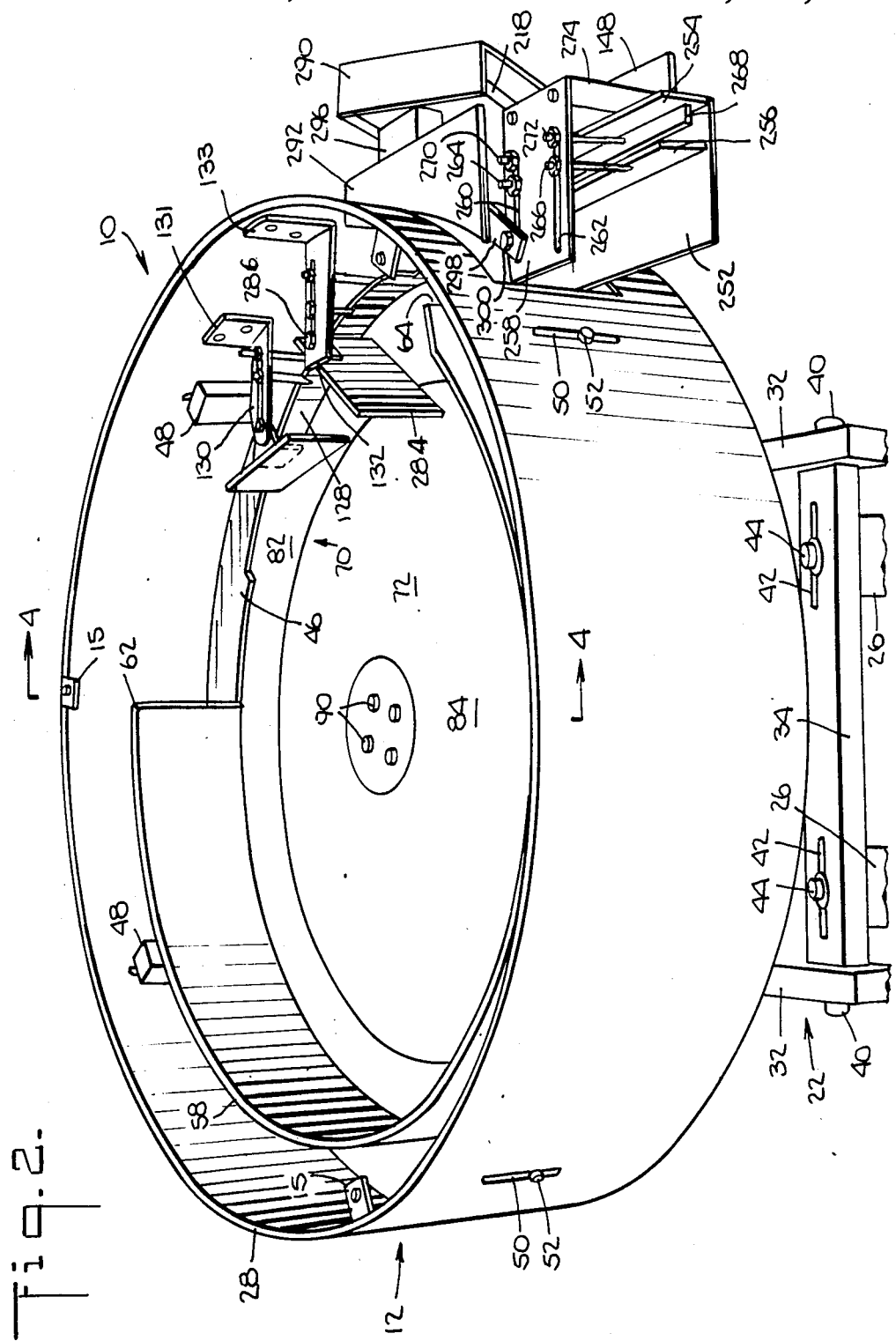
FIG. 2 is an enlarged view of the apparatus of FIG. 1 with the cover thereof removed and showing interior details of the apparatus.

Referring to FIGS. 1 through 4, a closure handling apparatus in accordance with this invention has been illustrated generally at 10. The apparatus 10 comprises a generally cylindrical receptacle or bowl 12 provided with a removable cover 14 that is supported on angle brackets 15. The cover 14 is provided with an opening 16 therein through which closures 17 to be oriented are delivered to the interior of the receptacle by means of a conveyer 18 and a hopper chute 20 of conventional construction. The receptacle 12 is supported upon a frame, shown generally at 22, including a pair of relatively long rear legs 24 and a pair of relatively short front legs 26 so that the receptacle 12 is tilted relative to a horizontal plane.

Figure 4:
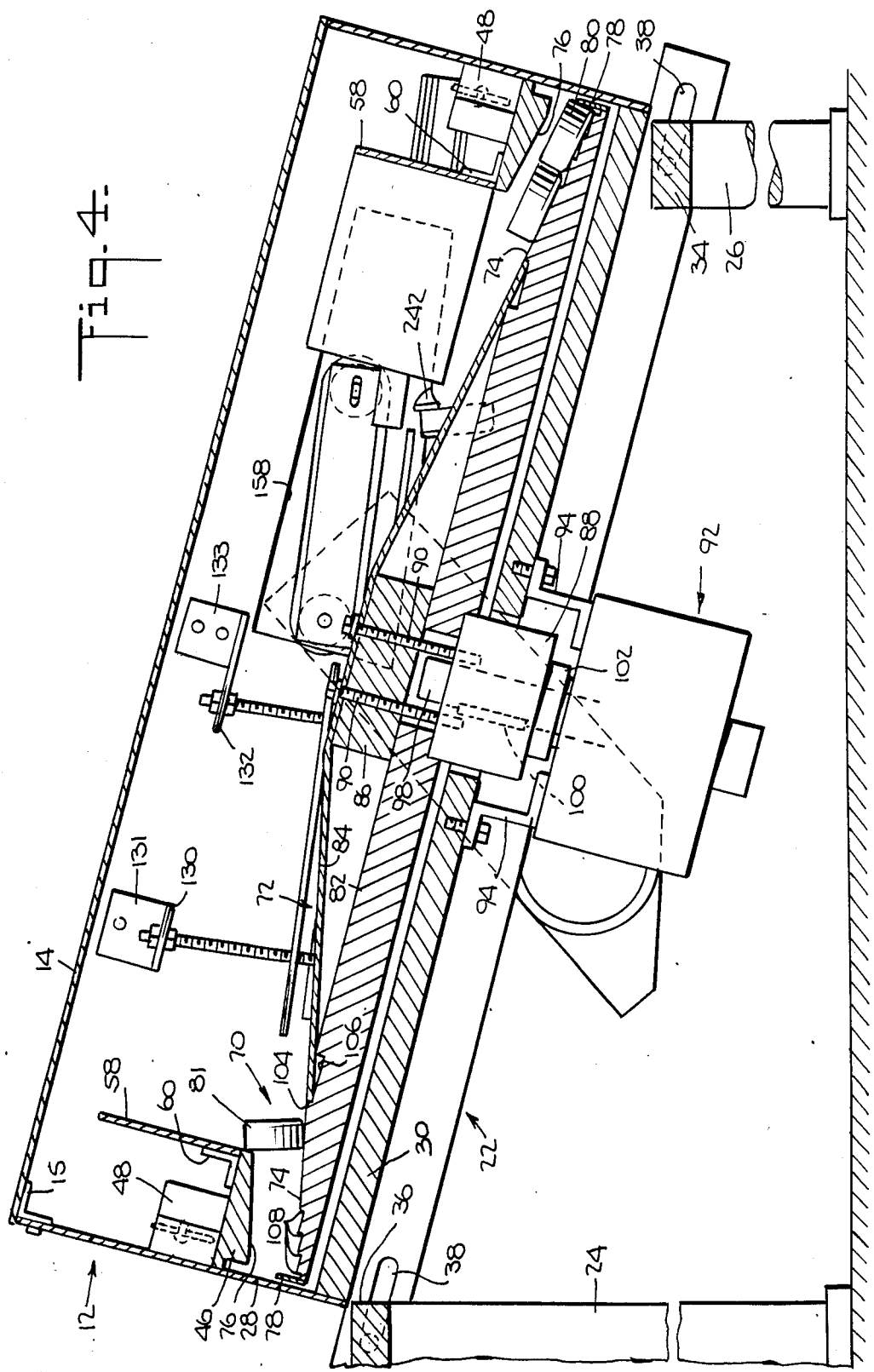
FIG. 4 is a sectional elevation view of the apparatus taken along the line 4—4 of FIG. 2, and with parts removed for clarity.

The receptacle 12 is generally cup-shaped and includes a generally cylindrical side wall or sleeve 28 and a base plate 30 (FIG. 4). The receptacle 12 is fixedly supported on a pair of side support members 32 which comprise part of the frame 22. The side support members 32 are laterally spaced apart from one another by means of respective front and rear cross bars 34 and 36, the side support members 32 being adjustably fixed to the cross bars by means of slots 38 formed therein and bolts 40 (FIG. 1). The cross bars 34 and 36, in turn, are adjustably fixed to their respective front legs 26 and rear legs 24 by means of slots 42 (FIG. 2) and bolts 44, the arrangement being such that the receptacle 12 may be adjusted slightly from side to side and from front to back to accommodate attachment to or alignment with equipment it is intended to cooperate with (e.g., conveying equipment, closure utilization equipment, and the like).

Referring more particularly to FIG. 4, a shelf member 46 is provided within the receptacle 12. The shelf member 46 is held in axially spaced relationship to the base plate 30 by means of a plurality of bracket blocks 48 which are fixed thereto and which are movable relative to slots 50 (FIG. 2) formed in the side wall 28 of the receptacle 12. The blocks are held in their respective positions within the slots 50 by means of bolts 52. The shelf member 46 extends about the inner wall of the receptacle 12 through a major portion thereof with its ends terminating at circumferentially spaced apart points 54 and 56 (FIG. 3) in order to provide clearance for the remaining mechanisms of the apparatus, as will appear in greater detail hereinafter.

The shelf member 46 is provided with a generally cylindrical, axially disposed shelf deflector or sleeve 58 which is fastened atop the shelf member 46 by means of a series of bracket members 60 (FIG. 4). The shelf deflector 58 extends circumferentially about the interior of the receptacle 12 through a major portion of its cicumference with its ends terminating at circumferentially spaced apart locations 62 and 64 (FIG. 2), the spacing being provided in order to accommodate other mechanisms of the apparatus, as will appear in greater detail hereinafter.

A feed means, shown generally at 70, is provided within the receptacle 12 for forming the closures into a moving column in which the closures are positioned on end with their open end randomly oriented either up or down. The feed means 70 includes the aforementioned shelf member 46, and a rotatable cone member 72, the outer peripheral surface 74 of which is vertically spaced from a lower surface 76 of the shelf member 46 by an amount which is slightly in excess of the height of the closures to be oriented. Accordingly, closures that are lying on the cone member 72 with either their open ends or their closed ends in contact with the cone member 72 may enter into the space between the surfaces 74 and 76 and move into contact with a band member 78 that surrounds the outer peripheral surface 74 of the cone member. As shown in FIG. 4, the closure 80 is positioned between the surfaces 74 and 76, in abutment with the band member 78.

Closures such as closure 81, on the other hand, which are lying on their edge surfaces, are restrained from entering into the space between surfaces 74 and 76 by the shelf deflector 58 until they are deflected or tumbled onto one or the other of their ends due to the rotation of the cone member 72.

The cone member 72 comprises a base feeder disc 82, which may for example by a phenolic member, and an upper conical plate member 84 of, for example, aluminum. A spacer member 86, positioned between the apex of the upper conical plate member 84 and the central portion of the base feeder disc 82, supports the plate member 84 in relation to the base feeder disc 82, and the base feeder disc 82, in turn, is supported on a hub member 88. The hub member 88, spacer member 86, upper conical plate member 84 and base feeder disc 82 are all bolted together into an integral rotatable assembly by means of centrally located bolts 90.

The rotatable cone member 72 is rotated by means of a motor and gear assembly, shown generally at 92, which is supported by brackets 94 that are bolted to the base plate 30 of the receptacle 12 by means of bolts 96. Motor and gear assembly 92 constitutes a drive means for rotating the cone member 72, and to this end the motor and gear assembly is provided with an output shaft 98 which is keyed, by means of a key 100, to the hub member 88. A collar 102 is employed to axially position the hub member 88 on the output shaft 98.

In order that the upper surface of the cone member 72 will provide a smooth transition between the outer peripheral edge 104 of the upper conical plate member 84 and the upper surface of the base feeder disc 82, the upper surface of the base feeder disc 82 is provided with a groove 106 which receives the peripheral edge 104. Similarly, the outer peripheral portion 74 of the base feeder disc 82 is provided with a series of grooves 108 which, as will appear more clearly hereinafter, are employed in transferring the closures 80 from the column of closures formed by the feed means 70 to the next downstream component in the closure handling apparatus, a discriminating means, shown generally at 120 in FIG. 4.

The discriminating means 120 is positioned within the receptacle 12, downstream of the feed means 70, and receives the column of closures assembled by the feed means. The discriminating means 120 serves to selectively pass closures having their open ends up out of the receptacle 12, and to return to the feed means 70 these closures which arrive at the discriminating means with their open end down.

The discriminating means 120 includes at its forward or input end a plurality of finger members 122 which have their upstream ends lying within and in contact with the grooves 108 of the base feeder disc 82, so that as the rotating cone member 72 brings closures 80 around the receptacle to the discriminating means 120, the closures 80 pass on to the fingers 122 and are lifted from the base feeder disc 82 onto a pickup plate 124 of the discriminating means 120, the closures 80 being pushed onto the pickup plate 124 by the pressure of subsequent closures in the moving column of closures generated by the feed means 70.

Guide means 126 and 128 are provided at either side of the column of closures on the pickup plate 124 to direct the movement of the closures onto and through the discriminating means. The guide rail 126 is fixedly carried on the pickup plate 124. The guide rail 128 is supported by a pair of brackets 130 and 132 having angle members 131 and 133 (FIG. 4), respectively, which are bolted to the inner surface of the sidewall 28 of receptacle 12. The brackets 130 and 132 adjustably support the guide rail 128 (FIG. 5) so that the width of the passageway provided between the guide rails 126 and 128 may be selectively adjusted. Guide rail 128 is supported from brackets 130 and 132 by means of bolts 134 and 136 which are adjustable in respective slots 138 and 140 of brackets 130 and 132.

Brackets 130 and 132 also carry a top rail guide 142 which is supported in the slots 138 and 140 by means of bolts 144 and 146, respectively. The top rail guide prevents the closures from popping up during their movement on the pickup plate 124.

Referring to FIG. 7, the pickup plate 124 is positioned upon and fastened by screws 147 to an exit plate 148 which, by means of an angle bracket 150 (FIG. 6) welded thereto is bolted by bolts 152 to the external surface of sidewall 28 of the cylindrical receptacle 12. The angle bracket 150 is provided with a slot 154 which, in conjunction with the bolt 152, provides adjustability for the entire discriminating means 120 to be raised or lowered relative to the base plate 30 of the receptacle 12.

A second angle bracket 156 also supports the downstream end of exit plate 148 externally of the receptacle 12 with the exit plate 148 passing through an opening 158 in the wall of the receptacle 12. The second angle bracket 156 is also provided with a slot 160 and bolt (not shown) to allow the exit plate 148 to be vertically adjusted.

Referring to FIG. 7, a generally triangularly shaped discriminator plate 170 is positioned atop the exit plate 148. The discriminator plate 170 is transversely adjustable relative to the exit plate 148 and to this end is provided with a slot 172 through which passes a bolt 174 which fixes the discriminator plate 170 at a selected position relative to the exit plate 148. A generally triangular camming plate 180 is also transversely adjustably carried atop the exit plate 148. The camming plate 180 is provided with slots 182 and 184 and respective bolts 186 and 188 which facilitate the selective transverse adjustment of the camming plate 180. Camming plate 180 cooperates with the discriminator plate 170 in providing the discriminating function for the discriminating means 120.

By suitably selecting the transverse positions of discriminator plate 170 and camming plate 180, a longitudinal gap 190 is set between the downstream end of plate 170 and the upstream end of plate 180. The gap 190 is selected to be greater than the wall thickness of the closures but less than the diameter of the closures. Preferably, the gap is in the order of $\frac{1}{8}$ to $\frac{3}{8}$ of the diameter of the closures so that each closure passing over discriminator plate 170 with its open end down will tilt downwardly when the wall thickness of the closure passes over the corner 192 of discriminating plate 170, as shown by closure 80a in FIG. 8.

Referring to FIGS. 5-8, the discriminating means 120 is provided with an accelerating means, shown generally at 200, for accelerating the lead closure 80b arriving at the discriminator plate 170 away from the column of closures formed in the feed means 70 and across the discriminator plate 170 toward the camming plate 180. The accelerating means 200 includes an elastomeric toothed belt 202, the lower surface of the lower reach 204 of which is spaced from the upper surface of the discriminator plate 170 by a distance which is slightly less than the axial thickness of the closures 80 so that the closures 80 arriving under the belt reach 204 are pinched between the plate 170 and the lower reach 204 of the elastomeric belt and are moved at an essentially synchronous speed with the belt across the plate 170.

The belt 202 is entrained about a drive pulley 206 and a driven pulley 208 each of which is provided with teeth that mesh with the teeth formed on the belt 202. The pulleys 206 and 208 are keyed to respective shafts 210 and 212 which are journaled in side support plates 204 and 216 which are fastened to one another and to a mounting plate 218 by transverse mounting brackets (not shown for sake of clarity).

Figure 6:
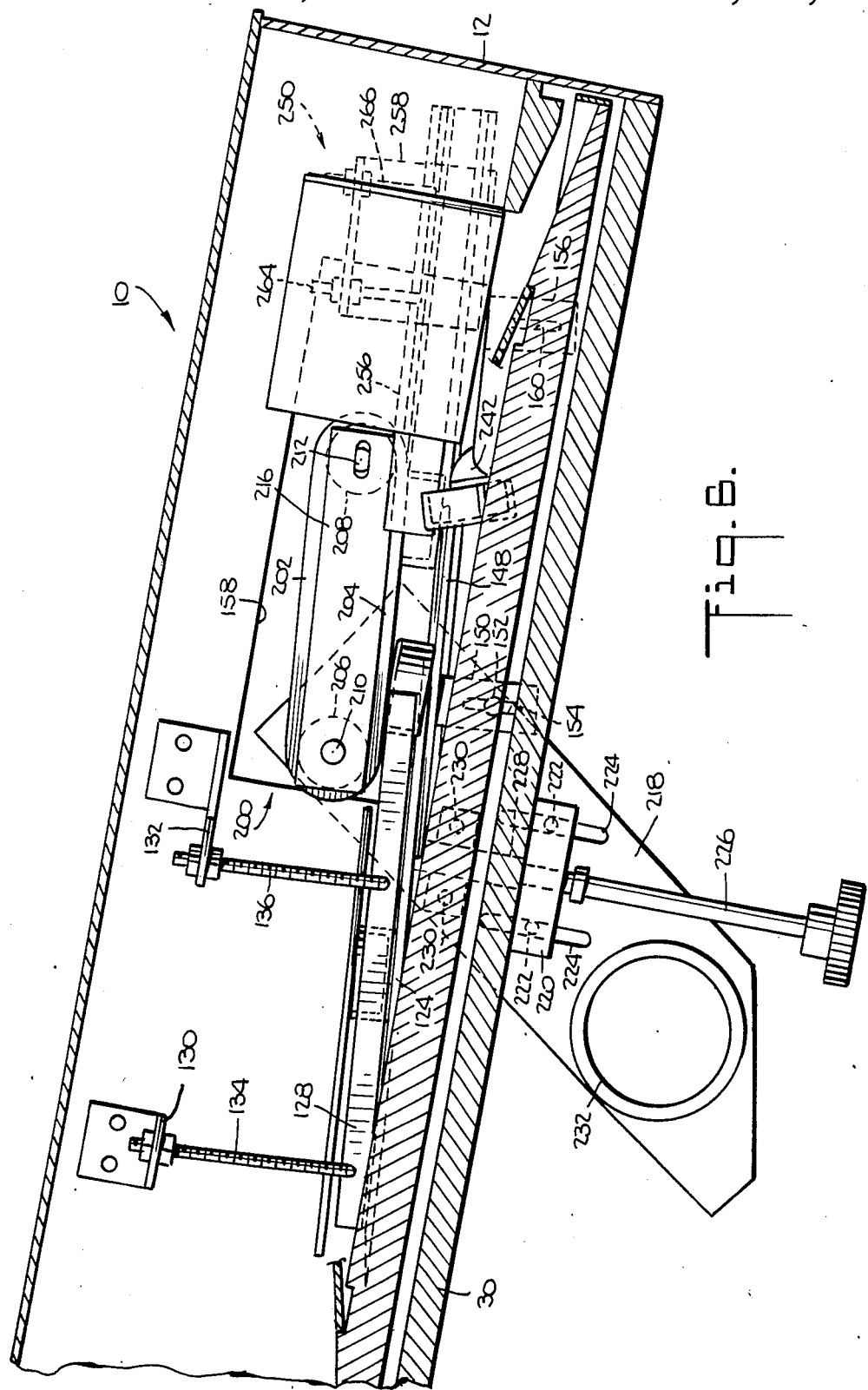
FIG. 6 is a sectional elevation view taken along the line 6—6 of FIG. 5.

Referring to FIG. 6, the mounting bracket 218, and thus the belt 202 and its pulleys 206 and 208, are supported from the base plate 30 of the receptacle 12 via a block 220 which is bolted or welded to the base plate and to which the mounting plate 218 is bolted by means of bolts 222 which pass through slots 224 formed in the mounting plate 218.

A lead screw 226 threadingly engages an elongated nut 228 which is bolted by bolts 230 to the mounting bracket 218. The lead screw 226 is employed in conjunction with the slots 224 and bolts 222 to raise and lower the lower reach 204 of the belt 202 relative to the discriminator plate 170 in order to facilitate operation of the accelerating means 200 in conjunction with closures of a different size. The lead screw 226 is freely rotatable in the block 220 but is provided with thrust bearings (not shown) which preclude axial movement of the lead screw 226 relative to the block 220.

The toothed elastomeric belt 202 is driven by means of a drive motor 232, the output shaft 234 (FIG. 5) of which drives the shaft 210 of pulley 206 by means of a pulley and belt arrangement comprising pulley 236 on shaft 234, belt 238 and pulley 240 on shaft 210.

The rotational speed of motor 232 and the diameter relationships of pulleys 236 and 240 are chosen so that the linear speed of the lower reach of belt 204 will significantly accelerate the lead closure 80 arriving at the lower each 204. Preferably the linear speed of belt 202 is about 2 times the peripheral linear speed of the closures in the moving column of closures formed in feed means 70, although this relationship is not critical, Referring to FIG. 8, when a closure 80$b$, having its open end down, arrives underneath the input end of the lower reach 204 of belt 202, it accelerates away from the column of closures behind it onto and across discriminator plate 170 until its leading edge passes over the corner 192 of the discriminator plate. At that point the closure tilts downwardly as the leading edge drops into the gap 190 and it continues to move across the gap 190 until its leading engages the upstream edge 181 of camming plate 180. At this point the open end down closure 80$a$ is cammed transversely of the path of the lower reach 204 and is projected along the leading edge 181 of camming plate 180 into contact with a deflecting finger or flipper cam 242 which, by virtue of a twist in excess of 90° therein, causes the closure exiting transversely from the discriminating means 120 to be flipped, or inverted, as shown sequentially by the closures 80$c$ and 80$d$. This causes closures rejected by the discriminating means 120 to be returned to the rotatable cone member 72 of the feed means 70 in a condition which is inverted from the position previously held in its original traverse through the system. Thus, although in its previous pass through the discriminating means it was in an open end down condition, in its next pass through the discriminating means it will be in an open end up position which will allow it to successfully pass through the discriminating means 120.

Referring now to FIG. 7, the movement of an open end up closure through the discriminating means 120 will now be considered. When an open end up closure 80$b$ at the head of the column of closures comes underneath the lower reach 204 of belt 202, it is accelerated away from the column of closures and over the discriminator plate 170. On reaching the gap 190, it continues to move in the same direction, crossing the gap 190 and ending up riding across the camming plate 180 to the output of the discriminator and then moving into the guide means, shown generally at 250. Since the open end of the closure is up when the closure reaches the gap, as shown at 80$e$, the solid lower surface of the closure precludes the closure from dropping into the gap 190 and allows it to smoothly traverse the gap to end up on the upper surface of the camming plate 180. This is true so long as the gap 190 is less than the diameter of the closure. Although the gap 190 can be greater than half the diameter of the closure if the tension in the belt 202 is sufficiently great to prevent open end up closures from tilting downwardly into the gap 190, it has been found preferable to adjust the relative positions of the discriminator plate 170 and camming plate 180 so that the gap 190 is no greater than one-half of the diameter of the closures being oriented. In the most preferred arrangement, the gap 190 is selected to be in the range of from $\frac{1}{8}$ to $\frac{3}{8}$ of the diameter of the closures, as indicated earlier.

Referring to FIGS. 5-8, the guide means or supply chute 250 is carried by the exit plate 148 downstream of the discriminating means 120. The guide means includes a track plate 252 fastened atop the exit plate 148 to provide a continuous surface for the closures to move upon downstream of the camming plate 180. The guide means 250 further includes a first side support rail 254 (FIG. 5) which serves as an extension to the guide rail 126 of the pickup plate 124. The side support rail 254 is fixedly attached to the exit plate 148. A second side support rail 256 is adjustably carried at a position spaced apart from the side support rail 254 by a bracket member 258. The bracket member 258 is provided with a pair of slots 260 and 262 with which respective bolts 264 and 266 cooperate in adjustably fixing the side support rail 256 to the bracket 258. A top rail guide 268 is also adjustably supported by the bracket member 258. Bolts 270 and 272 which pass through the respective slots 260 and 262 are employed in adjustably fastening the top rail guide 268 to bracket 258. The bracket 258 is bolted or otherwise rigidly fastened to the exit plate 148 by means of a block 274 (FIG. 1) so that the entire guide means assembly 250 is vertically adjustable in consonance with vertical adjustments made to the discriminating means 120.

Figure 3:
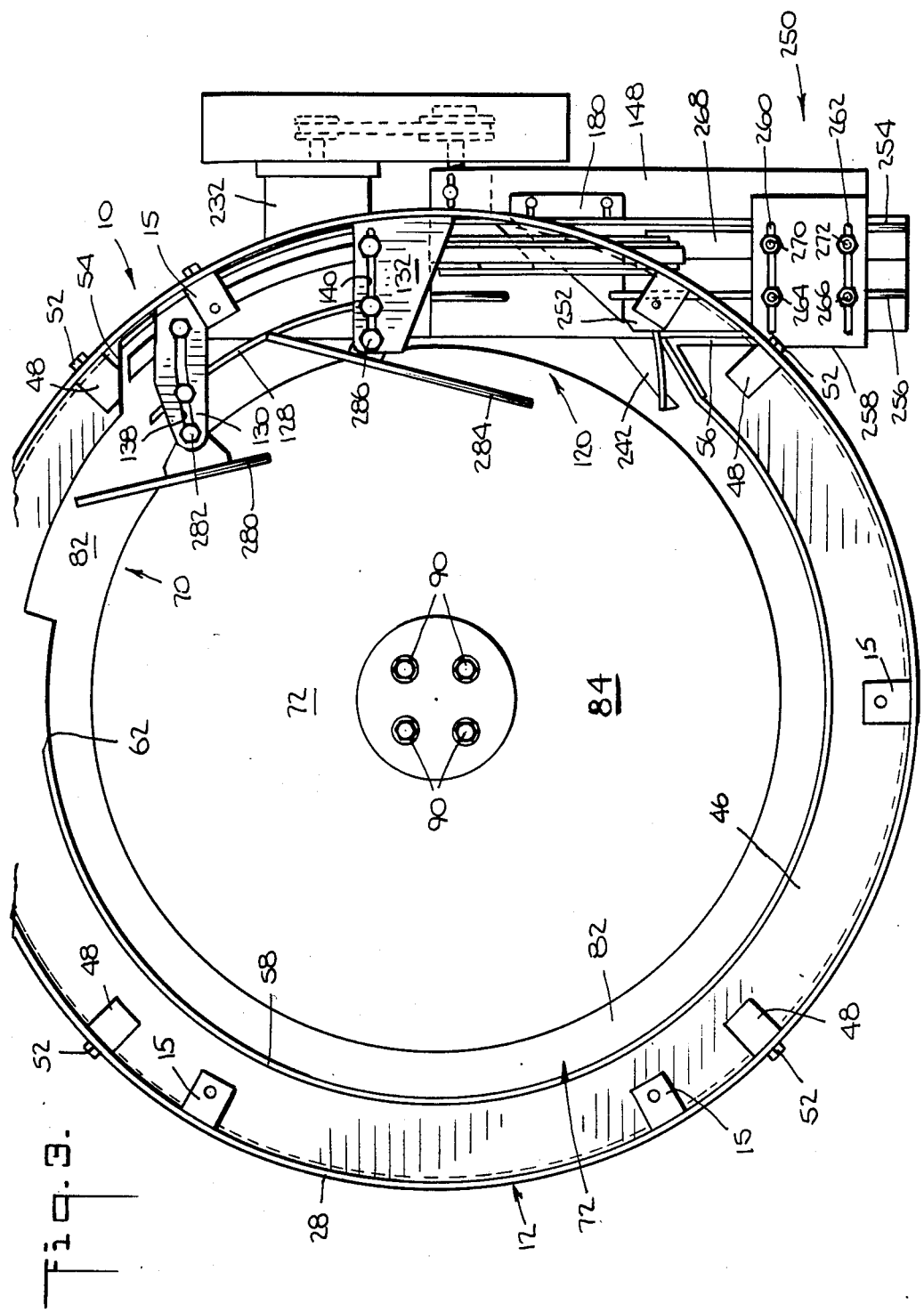
FIG. 3 is a plan view of the apparatus shown in FIG. 2, with parts removed for clarity.
Figure 5:
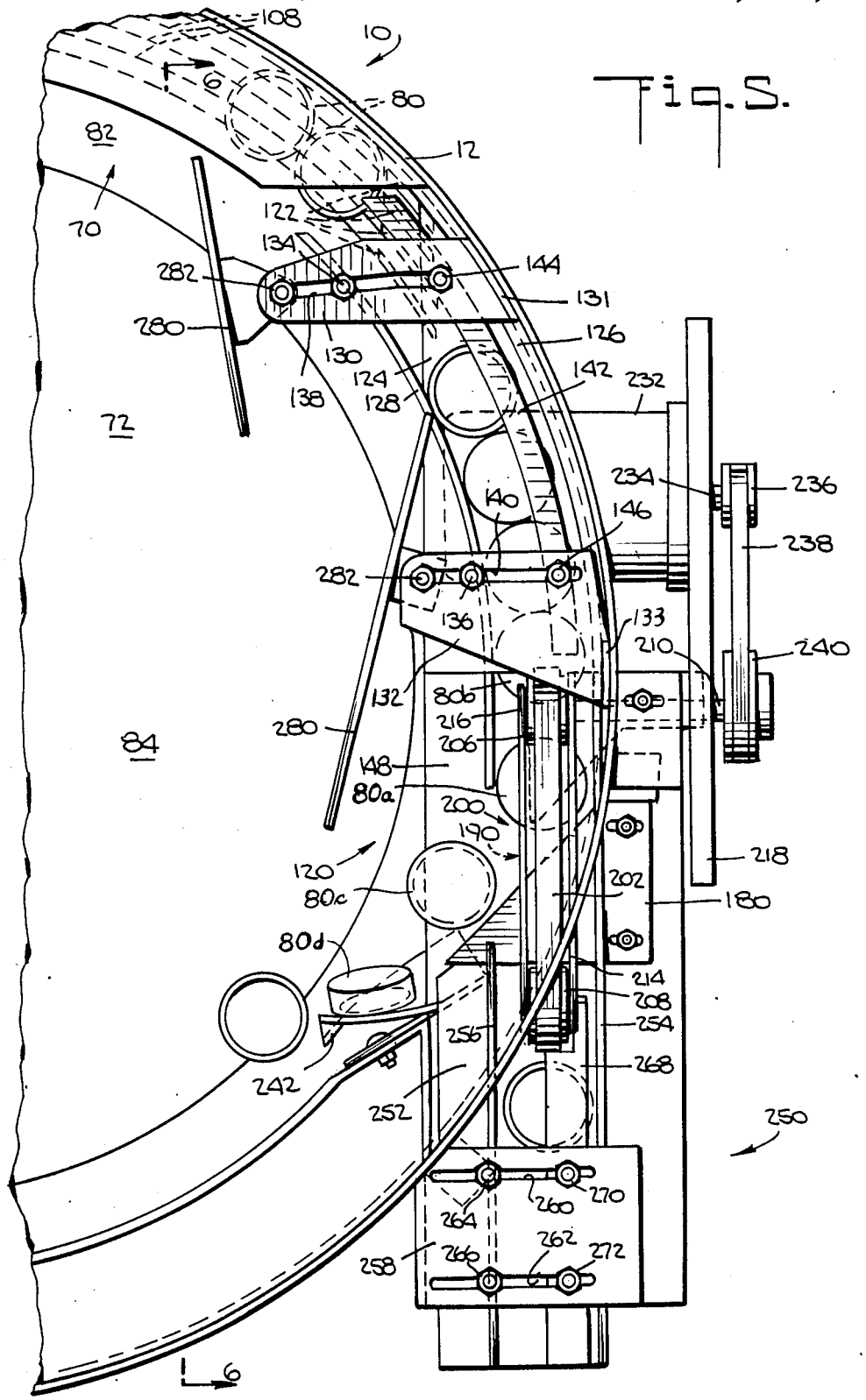
FIG. 5 is an enlarged, partial plan view similar to FIG. 3, with parts removed for clarity, and showing the discriminating means of the apparatus in greater detail.

Referring more particularly to FIGS. 3 and 5, a primary deflector plate 280 is provided within the receptacle 12 upstream of the discriminating means 120. The deflector plate 280 is adjustably supported from bracket 130 by means of a bolt 282 which is carried in the slot 138 of bracket 130. The deflector plate 280 is generally vertically disposed and positioned in close proximity to the upper surfaces of the base feeder disc 82 and the upper conical plate member 84. The deflector plate 280 cooperates with the upper surface of the cone member 72 during rotation of the latter to sweep closures that are lying on the upper surface of the cone member, but are not in the peripheral column of closures formed by feed means 70, away from the entrance area of the discriminating means 120. A second deflector plate 284 is also provided within the receptacle, in this case alongside the discriminating means 120. Deflector plate 284 is adjustably supported from bracket 132 by means of a bolt 286 which is carried in the slot 140 of bracket 132. Deflector plate 284 is also generally vertically disposed in close proximity to the upper surface of rotatable cone member 72 and cooperates therewith to sweep closures on this surface away from the exit area of discriminating means 120. This allows rejected closures issuing from the discriminating means 120 to be properly inverted by the deflecting finger 242 and repositioned back onto the upper surface of the rotatable cone member 72 without interference from closures that are already on the cone member and rotating therewith. The deflector plates 280 and 282 also serve to cause any closures that are standing on their side edges and rotating with the cone member 72 to be toppled over onto one or the other of their end surfaces in preparation for their sliding into the space between the shelf member 76 (FIG. 4) and the outer peripheral surface of cone member 72, in which position they join the peripheral column of closures which is fed from the feed means 70 to the discriminating means 120.

Referring to FIG. 1, a safety enclosure 290 is provided about the pulleys 236, 240 and the belt 238, for operator safety. This enclosure is bolted to the mounting plate 218 (FIG. 5) for these elements. Similarly, a guard plate 292 (FIG. 1) is provided above the accelerating means 200 for operator safety. Plate 292 is bolted at one end to a block 294 which is fixed to a second block 296 carried by mounting plate 218. Block 296 also supports side support plate 214 of accelerating means 200 and is provided with an opening therethrough (not shown) through which the shaft 210 (FIG. 7) of pulley 206 passes. The other end of guard plate 292 is supported by an arm 298 that is bolted to bracket 258 by means of bolts 300.

It will be apparent from the foregoing description that the objects of the invention have been achieved. Thus, novel and improved closure handling apparatus particularly adapted for sorting and orienting in a rapid and efficient manner, and without the use of compressed air, closures of the type which are greater in diameter than in height has been provided. In addition, the sorting and orienting operation takes place within the bulk supply receptacle of the apparatus so that only properly oriented closures exit from the receptacle. Also, a flipping means is provided in association with the discriminating mechanism of the apparatus in order to invert those closures which are rejected back to the bulk supply of closures so that during their next pass through the discriminating means, these closures will be properly oriented to pass through the same and exit to the guide means. And, finally, provisions are made in the closure handling apparatus for the various elements of the discriminating and orienting device to be adjustable in order to accommodate changes in the diameters and heights of the closures being handled.

While particular embodiments of this invention have been shown and described, it will be obvious to those skilled in the art that various other changes and modifications may be made without departing from this invention in its broader aspects, and it is, therefore, aimed in the appended claims to cover all such changes and modifications as fall within the true spirit and scope of this invention.

What is claimed is:

1. A discriminator device for separating upwardly facing from downwardly facing cup-shaped articles comprising:

means defining an article feed path extending in a substantially horizontal direction;

means defining a downwardly opening gap in said feed path;

means in said feed path including said downwardly opening gap adapted to discriminate between upwardly and downwardly facing cup-shaped articles in a manner to drop the downwardly facing cup-shaped articles and only the downwardly facing cup-shaped articles into said gap and below said feed path;

camming means comprising an edge of said gap oriented at an acute horizontal angle to said feed path for camming said dropped articles and only said dropped articles in a manner to force them horizontally out of said feed path;

and means for directly engaging each of said articles individually to drive them along said feed path past said gap in a manner to accelerate the progress of said upwardly facing articles past said gap and said camming means in said horizontal direction, but to force said downwardly facing articles against said camming means for positively ejecting them horizontally from said feed path.

* * * * *

UNITED STATES PATENT AND TRADEMARK OFFICE
CERTIFICATE OF CORRECTION

PATENT NO. : 4,699,261

DATED : October 13, 1987

INVENTOR(S) : William Z. Nesin

It is certified that error appears in the above-identified patent and that said Letters Patent is hereby corrected as shown below:

On the title page the following should be inserted.

-- [73] Assignee: Roto Systems, Inc.
Trumbull, Conn.--.

Signed and Sealed this

Fifth Day of April, 1988

Attest:

DONALD J. QUIGG

*Attesting Officer*    *Commissioner of Patents and Trademarks*